(12) United States Patent
Nataneli et al.

(10) Patent No.: US 12,399,923 B1
(45) Date of Patent: Aug. 26, 2025

(54) MULTI-MODAL ENHANCEMENT OF LARGE LANGUAGE MODELS WITHOUT RETRAINING

(71) Applicants: Gabriele Nataneli, Los Angeles, CA (US); Eric Savitsky, Malibu, CA (US)

(72) Inventors: Gabriele Nataneli, Los Angeles, CA (US); Eric Savitsky, Malibu, CA (US)

( * ) Notice: Subject to any disclaimer, the term of this patent is extended or adjusted under 35 U.S.C. 154(b) by 0 days.

(21) Appl. No.: 18/886,698

(22) Filed: Sep. 16, 2024

Related U.S. Application Data

(60) Provisional application No. 63/583,092, filed on Sep. 15, 2023.

(51) Int. Cl.
  *G06F 16/33* (2025.01)
  *G06F 16/334* (2025.01)
  *G06F 16/353* (2025.01)

(52) U.S. Cl.
  CPC ........ *G06F 16/3347* (2019.01); *G06F 16/353* (2019.01)

(58) Field of Classification Search
  CPC ........................... G06F 16/3347; G06F 16/353
  See application file for complete search history.

(56) References Cited

U.S. PATENT DOCUMENTS

| | | | |
|---|---|---|---|
| 1,488,233 A | 3/1924 | Frederick | |
| 1,762,937 A | 6/1930 | Staud | |
| 2,019,121 A | 10/1935 | De | |
| 2,112,019 A | 3/1938 | Gyger | |
| 2,127,610 A | 8/1938 | Moore | |
| 2,705,049 A | 3/1955 | Brooks | |

(Continued)

FOREIGN PATENT DOCUMENTS

| | | |
|---|---|---|
| EP | 1103223 A2 | 5/2001 |
| EP | 2801966 A1 | 11/2014 |

(Continued)

OTHER PUBLICATIONS

Aligned Management Associates, Inc., Corporate home page describing organizing committee, overview, Procedicus MIST[trademark]-suturing module 30.0, 6 pgs., obtained from website Sep. 6, 2004.

(Continued)

*Primary Examiner* — Loc Tran
(74) *Attorney, Agent, or Firm* — Cislo & Thomas, LLP

(57) ABSTRACT

A system and method for enhancing query responses from large language models without retraining by converting a query into a query vector; using a proximity metric to measure a proximity from the query vector to a plurality of vector embeddings stored in a vector database; ranking the plurality of vector embeddings based on proximity to the query vector; mapping the query to a homogenized context vector from a plurality of homogenized context vectors; using an augmented proximity metric to convert the proximity to an augmented proximity for each vector embeddings; performing an augmented ranking to refine the vector embeddings to those most relevant to the query; creating a prompt for a large language model comprising the query and the text data corresponding to refined vector embeddings as context; and feeding the prompt to the large language model to generate a response to the query.

16 Claims, 8 Drawing Sheets

(56) References Cited

U.S. PATENT DOCUMENTS

| | | |
|---|---|---|
| 2,705,307 A | 3/1955 | Edson |
| 2,722,947 A | 11/1955 | Frank |
| 2,886,316 A | 5/1959 | Carl |
| 4,040,171 A | 8/1977 | Cline et al. |
| 4,838,863 A | 6/1989 | Allard et al. |
| 4,838,869 A | 6/1989 | Allard |
| 4,994,034 A | 2/1991 | Botich et al. |
| 5,231,381 A | 7/1993 | Duwaer |
| 5,513,992 A | 5/1996 | Refait |
| 5,609,485 A | 3/1997 | Bergman et al. |
| 5,678,565 A | 10/1997 | Sarvazyan |
| 5,689,443 A | 11/1997 | Ramanathan |
| 5,701,900 A | 12/1997 | Shehada et al. |
| 5,704,791 A | 1/1998 | Gillio |
| 5,755,577 A | 5/1998 | Gillio |
| 5,767,839 A | 6/1998 | Rosenberg |
| 5,776,062 A | 7/1998 | Nields |
| 5,791,908 A | 8/1998 | Gillio |
| 5,800,177 A | 9/1998 | Gillio |
| 5,800,178 A | 9/1998 | Gillio |
| 5,800,179 A | 9/1998 | Bailey |
| 5,800,350 A | 9/1998 | Coppleson et al. |
| 5,827,942 A | 10/1998 | Madsen et al. |
| 5,882,206 A | 3/1999 | Gillio |
| 5,889,237 A | 3/1999 | Makinwa |
| 5,934,288 A | 8/1999 | Avila et al. |
| 6,001,472 A | 12/1999 | Ikeda et al. |
| 6,048,312 A | 4/2000 | Ishrak et al. |
| 6,063,030 A | 5/2000 | Vara et al. |
| 6,068,597 A | 5/2000 | Lin |
| 6,074,213 A | 6/2000 | Hon |
| 6,113,395 A | 9/2000 | Hon |
| 6,117,078 A | 9/2000 | Lysyansky et al. |
| 6,122,538 A | 9/2000 | Sliwa, Jr. et al. |
| 6,156,213 A | 12/2000 | Dudley et al. |
| 6,193,657 B1 | 2/2001 | Drapkin |
| 6,267,599 B1 | 7/2001 | Bailey |
| 6,468,212 B1 | 10/2002 | Scott et al. |
| 6,502,756 B1 | 1/2003 | Faahraeus |
| 6,511,427 B1 | 1/2003 | Sliwa, Jr. et al. |
| 6,548,768 B1 | 4/2003 | Pettersson et al. |
| 6,570,104 B1 | 5/2003 | Ericson et al. |
| 6,654,000 B2 | 11/2003 | Rosenberg |
| 6,663,008 B1 | 12/2003 | Pettersson et al. |
| 6,665,554 B1 | 12/2003 | Charles et al. |
| 6,666,376 B1 | 12/2003 | Ericson |
| 6,667,695 B2 | 12/2003 | Pettersson et al. |
| 6,674,427 B1 | 1/2004 | Pettersson et al. |
| 6,689,966 B2 | 2/2004 | Wiebe |
| 6,693,626 B1 | 2/2004 | Rosenberg |
| 6,694,163 B1 | 2/2004 | Vining |
| 6,698,660 B2 | 3/2004 | Faahraeus et al. |
| 6,714,213 B1 | 3/2004 | Lithicum et al. |
| 6,714,901 B1 | 3/2004 | Cotin et al. |
| 6,719,470 B2 | 4/2004 | Berhin |
| 6,722,574 B2 | 4/2004 | Skantze et al. |
| 6,732,927 B2 | 5/2004 | Olsson et al. |
| 6,750,877 B2 | 6/2004 | Rosenberg et al. |
| 6,780,016 B1 | 8/2004 | Toly |
| 6,816,148 B2 | 11/2004 | Mallett et al. |
| 6,836,555 B2 | 12/2004 | Ericson et al. |
| 6,854,821 B2 | 2/2005 | Ericson et al. |
| 6,864,880 B2 | 3/2005 | Hugosson et al. |
| 6,878,062 B2 | 4/2005 | Bjorklund et al. |
| 6,896,650 B2 | 5/2005 | Tracey et al. |
| 6,916,283 B2 | 7/2005 | Tracey et al. |
| 6,927,916 B2 | 8/2005 | Craven-Bartle |
| 6,929,183 B2 | 8/2005 | Pettersson |
| 6,929,481 B1 | 8/2005 | Alexander et al. |
| 6,947,033 B2 | 9/2005 | Faahraeus et al. |
| 6,958,747 B2 | 10/2005 | Sahlberg et al. |
| 6,966,495 B2 | 11/2005 | Lynggaard et al. |
| 6,992,655 B2 | 1/2006 | Ericson et al. |
| 7,002,559 B2 | 2/2006 | Ericson |
| 7,035,429 B2 | 4/2006 | Andreasson |
| 7,037,258 B2 | 5/2006 | Chatenever et al. |
| 7,050,653 B2 | 5/2006 | Edso et al. |
| 7,054,487 B2 | 5/2006 | Ericson et al. |
| 7,072,529 B2 | 7/2006 | Hugosson et al. |
| 7,089,308 B2 | 8/2006 | Fransson et al. |
| 7,094,977 B2 | 8/2006 | Ericson et al. |
| 7,110,604 B2 | 9/2006 | Olsson |
| 7,120,320 B2 | 10/2006 | Petterson et al. |
| 7,121,465 B2 | 10/2006 | Rignell |
| 7,127,682 B2 | 10/2006 | Sandstrom et al. |
| 7,143,952 B2 | 12/2006 | Ericson |
| 7,145,556 B2 | 12/2006 | Pettersson |
| 7,154,056 B2 | 12/2006 | Bergqvist et al. |
| 7,162,087 B2 | 1/2007 | Bryborn |
| 7,167,164 B2 | 1/2007 | Ericson et al. |
| 7,172,131 B2 | 2/2007 | Pettersson et al. |
| 7,175,095 B2 | 2/2007 | Pettersson et al. |
| 7,176,896 B1 | 2/2007 | Fahraeus et al. |
| 7,180,509 B2 | 2/2007 | Fermgard et al. |
| 7,195,166 B2 | 3/2007 | Olsson et al. |
| 7,202,861 B2 | 4/2007 | Lynggaard |
| 7,202,963 B2 | 4/2007 | Wiebe et al. |
| 7,239,306 B2 | 7/2007 | Fahraeus et al. |
| 7,246,321 B2 | 7/2007 | Bryborn et al. |
| 7,248,250 B2 | 7/2007 | Pettersson et al. |
| 7,249,256 B2 | 7/2007 | Hansen et al. |
| 7,249,716 B2 | 7/2007 | Bryborn |
| 7,254,839 B2 | 8/2007 | Fahraeus et al. |
| 7,278,017 B2 | 10/2007 | Skantze |
| 7,281,668 B2 | 10/2007 | Pettersson et al. |
| 7,283,676 B2 | 10/2007 | Olsson |
| 7,293,697 B2 | 11/2007 | Wiebe et al. |
| 7,295,193 B2 | 11/2007 | Fahraeus |
| 7,296,075 B2 | 11/2007 | Lynggaard |
| 7,321,692 B2 | 1/2008 | Bryborn et al. |
| 7,333,947 B2 | 2/2008 | Wiebe et al. |
| 7,345,673 B2 | 3/2008 | Ericson et al. |
| 7,353,393 B2 | 4/2008 | Hansen et al. |
| 7,356,012 B2 | 4/2008 | Wiebe et al. |
| 7,371,068 B2 | 5/2008 | Lloyd et al. |
| 7,382,361 B2 | 6/2008 | Burstrom et al. |
| 7,385,595 B2 | 6/2008 | Bryborn et al. |
| 7,408,536 B2 | 8/2008 | Hugosson et al. |
| 7,415,501 B2 | 8/2008 | Burstrom |
| 7,418,160 B2 | 8/2008 | Lynggaard |
| 7,422,154 B2 | 9/2008 | Ericson |
| 7,441,183 B2 | 10/2008 | Burstrom et al. |
| 7,457,413 B2 | 11/2008 | Thuvesholmen et al. |
| 7,457,476 B2 | 11/2008 | Olsson |
| 7,543,753 B2 | 6/2009 | Pettersson |
| 7,588,191 B2 | 9/2009 | Pettersson et al. |
| 7,600,693 B2 | 10/2009 | Pettersson |
| 7,649,637 B2 | 1/2010 | Wiebe et al. |
| 7,670,070 B2 | 3/2010 | Craven-Bartle |
| 7,672,513 B2 | 3/2010 | Bjorklund et al. |
| 7,701,446 B2 | 4/2010 | Sahlberg et al. |
| 7,710,408 B2 | 5/2010 | Ericson |
| 7,751,089 B2 | 7/2010 | Fahraeus et al. |
| 7,753,283 B2 | 7/2010 | Lynggaard |
| 7,777,777 B2 | 8/2010 | Bowman et al. |
| 7,788,315 B2 | 8/2010 | Johansson |
| 7,794,388 B2 | 9/2010 | Draxinger et al. |
| 7,806,696 B2 | 10/2010 | Alexander et al. |
| 7,833,018 B2 | 11/2010 | Alexander et al. |
| 7,850,454 B2 | 12/2010 | Toly |
| 7,857,626 B2 | 12/2010 | Toly |
| 7,871,850 B2 | 1/2011 | Park |
| 7,931,470 B2 | 4/2011 | Alexander et al. |
| 8,244,506 B2 | 8/2012 | Butsev et al. |
| 8,294,972 B2 | 10/2012 | Chung |
| 8,428,326 B2 | 4/2013 | Falk et al. |
| 8,480,404 B2 | 7/2013 | Savitsky |
| 8,480,406 B2 | 7/2013 | Alexander et al. |
| 8,556,635 B2 | 10/2013 | Toly |
| 8,721,344 B2 | 5/2014 | Marmaropoulos et al. |
| 9,128,116 B2 | 9/2015 | Welch et al. |
| 9,251,721 B2 | 2/2016 | Lampotang |
| 9,436,993 B1 | 9/2016 | Stolka |
| 9,870,721 B2 | 1/2018 | Savitsky et al. |

(56) References Cited

U.S. PATENT DOCUMENTS

| | | |
|---|---|---|
| 9,911,365 B2 | 3/2018 | Siassi |
| 10,052,010 B2 | 8/2018 | Feddema |
| 10,132,015 B2 | 11/2018 | Woodruff et al. |
| 10,849,585 B1 | 12/2020 | Teixeira |
| 11,011,077 B2 | 5/2021 | Garcia Kilroy |
| 2001/0031920 A1 | 10/2001 | Kaufman et al. |
| 2002/0076581 A1 | 6/2002 | McCoy |
| 2002/0076681 A1 | 6/2002 | Leight et al. |
| 2002/0088926 A1 | 7/2002 | Prasser |
| 2002/0099310 A1 | 7/2002 | Kimchy et al. |
| 2002/0168618 A1 | 11/2002 | Anderson et al. |
| 2002/0173721 A1 | 11/2002 | Grunwald et al. |
| 2004/0043368 A1 | 3/2004 | Hsieh et al. |
| 2004/0087850 A1 | 5/2004 | Okerlund et al. |
| 2005/0119569 A1 | 6/2005 | Ohtake |
| 2005/0181342 A1 | 8/2005 | Toly |
| 2005/0214726 A1 | 9/2005 | Feygin et al. |
| 2005/0228617 A1 | 10/2005 | Kerwin |
| 2005/0283075 A1 | 12/2005 | Ma et al. |
| 2006/0020204 A1 | 1/2006 | Serra et al. |
| 2006/0098010 A1 | 5/2006 | Dwyer et al. |
| 2007/0088213 A1 | 4/2007 | Poland |
| 2007/0161904 A1 | 7/2007 | Urbano |
| 2007/0232907 A1 | 10/2007 | Pelissier et al. |
| 2007/0236514 A1 | 10/2007 | Agusanto |
| 2007/0238085 A1 | 10/2007 | Colvin et al. |
| 2008/0009743 A1 | 1/2008 | Hayasaka |
| 2008/0137071 A1 | 6/2008 | Chow |
| 2008/0187896 A1 | 8/2008 | Savitsky |
| 2008/0200807 A1 | 8/2008 | Wright et al. |
| 2008/0204004 A1 | 8/2008 | Anderson |
| 2008/0269606 A1 | 10/2008 | Matsumura |
| 2008/0294096 A1 | 11/2008 | Uber et al. |
| 2008/0312884 A1 | 12/2008 | Hostettler et al. |
| 2009/0006419 A1 | 1/2009 | Savitsky |
| 2009/0043195 A1 | 2/2009 | Poland |
| 2009/0046912 A1 | 2/2009 | Hostettler |
| 2009/0130642 A1 | 5/2009 | Tada et al. |
| 2009/0209859 A1 | 8/2009 | Tsujita |
| 2009/0266957 A1 | 10/2009 | Cermak |
| 2009/0305213 A1 | 12/2009 | Burgkart et al. |
| 2009/0311655 A1 | 12/2009 | Karkanias et al. |
| 2010/0055657 A1 | 3/2010 | Goble et al. |
| 2010/0104162 A1 | 4/2010 | Falk et al. |
| 2010/0179428 A1 | 7/2010 | Pedersen et al. |
| 2010/0268067 A1 | 10/2010 | Razzaque et al. |
| 2010/0277422 A1 | 11/2010 | Muresianu et al. |
| 2011/0010023 A1 | 1/2011 | Kunzig |
| 2011/0306025 A1 | 12/2011 | Sheehan |
| 2012/0021993 A1 | 1/2012 | Kim et al. |
| 2012/0058457 A1 | 3/2012 | Savitsky |
| 2012/0143142 A1 | 6/2012 | Klein |
| 2012/0150797 A1 | 6/2012 | Landy et al. |
| 2012/0179039 A1 | 7/2012 | Pelissier et al. |
| 2012/0200977 A1 | 8/2012 | Nestler |
| 2012/0219937 A1 | 8/2012 | Hughes et al. |
| 2012/0237102 A1 | 9/2012 | Savitsky |
| 2012/0237913 A1 | 9/2012 | Savitsky |
| 2012/0238875 A1 | 9/2012 | Savitsky et al. |
| 2012/0251991 A1 | 10/2012 | Savitsky et al. |
| 2013/0046523 A1 | 2/2013 | Van Dinther |
| 2013/0064036 A1 | 3/2013 | Lee et al. |
| 2013/0065211 A1 | 3/2013 | Amso et al. |
| 2013/0137989 A1 | 5/2013 | Chen |
| 2013/0158411 A1 | 6/2013 | Miyasaka |
| 2013/0179306 A1 | 7/2013 | Want et al. |
| 2013/0236872 A1 | 9/2013 | Laurusonis et al. |
| 2013/0323700 A1 | 12/2013 | Samosky et al. |
| 2014/0000448 A1 | 1/2014 | Franklin, III |
| 2014/0087347 A1 | 3/2014 | Tracy |
| 2014/0114194 A1 | 4/2014 | Kanayama et al. |
| 2014/0119645 A1 | 5/2014 | Zimet-Rubner |
| 2014/0120505 A1 | 5/2014 | Rios et al. |
| 2014/0170620 A1 | 6/2014 | Savitsky |
| 2014/0228685 A1 | 8/2014 | Eelbode |
| 2014/0272878 A1 | 9/2014 | Shim et al. |
| 2015/0056591 A1 | 2/2015 | Tepper et al. |
| 2015/0078639 A1 | 3/2015 | Hausotte |
| 2015/0084897 A1 | 3/2015 | Nataneli |
| 2015/0086956 A1 | 3/2015 | Savitsky |
| 2015/0140538 A1 | 5/2015 | Savitsky |
| 2015/0154890 A1 | 6/2015 | Savitsky |
| 2015/0213731 A1 | 7/2015 | Sato |
| 2015/0327838 A1 | 11/2015 | Francis et al. |
| 2016/0104393 A1 | 4/2016 | Savitsky |
| 2016/0259424 A1 | 9/2016 | Nataneli |
| 2016/0314715 A1 | 10/2016 | Savitsky |
| 2016/0314716 A1 | 10/2016 | Grubbs |
| 2016/0328998 A1 | 11/2016 | Pedersen et al. |
| 2016/0343514 A1 | 11/2016 | Uchida et al. |
| 2017/0018204 A1 | 1/2017 | Savitsky |
| 2017/0028141 A1 | 2/2017 | Fiedler et al. |
| 2017/0035517 A1 | 2/2017 | Geri |
| 2017/0046985 A1 | 2/2017 | Hendrickson et al. |
| 2017/0110032 A1 | 4/2017 | O'Brien et al. |
| 2017/0270829 A1 | 9/2017 | Bauss |
| 2017/0352294 A1 | 12/2017 | Nataneli |
| 2018/0137784 A1 | 5/2018 | Savitsky |
| 2018/0197441 A1 | 7/2018 | Rios |
| 2018/0211563 A1 | 7/2018 | Savitsky |
| 2018/0330635 A1 | 11/2018 | Savitsky |
| 2018/0366034 A1 | 12/2018 | Gelpi |
| 2019/0057620 A1 | 2/2019 | Eggert |
| 2019/0231436 A1 | 8/2019 | Panse |
| 2019/0321657 A1 | 10/2019 | Hale |
| 2019/0371204 A1 | 12/2019 | Savitsky |
| 2020/0126449 A1 | 4/2020 | Horst |
| 2020/0138518 A1 | 5/2020 | Lang |
| 2020/0242971 A1 | 7/2020 | Wang |
| 2020/0242972 A1 | 7/2020 | Petrinec |
| 2021/0128125 A1 | 5/2021 | Sitti |
| 2021/0134186 A1 | 5/2021 | Savitsky |
| 2021/0186311 A1 | 6/2021 | Levy |
| 2021/0353381 A1 | 11/2021 | Usui et al. |
| 2022/0012875 A1 | 1/2022 | Arnaout |
| 2023/0194415 A1* | 6/2023 | Reimann ............. G16C 20/20<br>250/252.1 |
| 2025/0068625 A1* | 2/2025 | Currell ............. G06F 16/243 |

FOREIGN PATENT DOCUMENTS

| | | |
|---|---|---|
| JP | 2011097238 A | 5/2011 |
| RU | 1994040171 | 11/1994 |
| RU | 2127610 C1 | 3/1999 |
| WO | 2006060406 A1 | 6/2006 |

OTHER PUBLICATIONS

American Academy of Emergency Medicine, conference: 11th annual scientific assembly preconference ultrasound courts, http://www.aaem.org/education/scientificassembly/sa05/precon/ultrasound.shtml, 6 pgs, obtained from website Feb. 16, 2005.

Barbosa, J. et al., "Computer education in emergency medicine residency programs," http://www.med-ed-online.org/res00002.htm, 8 pgs, obtained from website Sep. 6, 2004.

Brannam, Let al, "Emergency nurses utilization of ultrasound guidance for placement of peripheral intravenous lines in difficult-access patients," Acad Emerg Med, 11(12): 1361-1363, Dec. 2004.

Calvert, N. et al., "The effectiveness and cost-effectiveness of ultrasound locating devices for central venous access: a systematic review and economic evaluation/executive summary," Health Tech Assess 2003, 7(12), 4 pgs.

Center for Human Simulation, corporate home page describing overview/people, http://www.uchsc.edu, 7 pgs, obtained from website Sep. 6, 2004.

Chung, Gregory, "Effects of Simulation-Based Practice on Focused Assessment . . . ", Military Medicine, Oct. 2013, vol. 178.

CIMIT News, "The medical access program: new CIMIT initiative to benefit underserved patients/partners telemedicine and CIMIT launch new initiative: stay connected, be healthy/highlights: operating room of the future plug-and-play project," http://www.cimit.

(56) References Cited

OTHER PUBLICATIONS org, Jan. 2005; Vol11(2), 2 pgs., obtained from website Mar. 1, 2005.
Colt, H. G. et al., "Virtual reality bronchoscopy simulation: a revolution in procedural training," Chest 2001; 120:1333-1339.
Computer Motion, "About computer motion: technology to enhance surgeons capabilities, improve patient outcomes and reduce healthcare costs/corporate alliances/products solutions for surgical innovation/training on the da Vinci[registered] surgical system-introduction," 2002 Computer Motion, http://www.computermotion.com, 6 pgs.
Delp, Setal, "Surgical simulation—an emerging technology for training in emergency medicine," Presence, 6(2): 147-159, Apr. 1997 (abstract).
Dorner, R. et. al., "Synergies between interactive training simulations and digital storytelling: a component-based framework," Computer Graphics, 26(1):45-55, Feb. 2002 (abstract).
Duque, D. and Kessler S., "Ultrasound guided vascular access," Amer Coli Emerg Phy., http://www.nyacep.org/education/articles/ultrasound%20vascular%20access.htm, 2 pgs, obtained from website May 11, 2005.
Espinet, A. and Dunning J., "Does ultrasound-guided central line insertion reduce complications and time to placement in elective patients undergoing cardiac surgery," Inter Cardiovascular Thoracic Surg, 3:523-527, 2004; http://licvts.ctsnetjournals.org/cgi/content/full/3/3/523, 6 pgs, obtained from website May 11, 2005 (abstract).
Gallagher, A. G. et al., "Virtual reality training for the operating room and cardiac catheterization laboratory," Lancet, 364:1538-1540, Oct. 23, 2004.
Gallagher, A. G. et. al., "Psychomotor skills assessment in practicing surgeons experienced in performing advanced laparoscopic procedures," AM Coli Surg, 197(3):479-488, Sep. 2003.
Gausche, M. et. al., "Effect on out-of-hospital pediatric endotracheal intubation on survival and neurological outcome: a controlled clinical trial," JAMA, 283(6):783-790, Feb. 9, 2000.
Gore, D. C. and Gregory, S. R., "Historical perspective on medical errors: Richard Cabot and the Institute of Medicine," J Amer Coli Surg, 197(4), 5 pgs, Oct. 2003.
Grantcharov, T. P. et. al., "Learning curves and impact of previous operative experience on performance on a virtual reality simulator to test laparoscopic surgical skills," Am J Surg, 185(2):146-149, Feb. 1, 2004 (abstract).
Grantcharov, T. P. et. al., "Randomized clinical trial of virtual reality simulation for laparoscopic skills training," Br J Surg, 91(2):146-150, Feb. 1, 2004 (abstract).
Haluck, R. S., et. al., "Are surgery training programs ready for virtual reality A survey of program directors in general surgery," Arch Surg, 135(7):786-792, Jul. 1, 2000.
Helmreich, R. L., "On error management: lessons from aviation," BMJ, 320:781-785, Mar. 2000.
Huckman, R. S. and Pisano, G. P., "Turf battles in coronary revascularization," N Engl J Med, http://www.nejm.org, 4 pgs, 352(9):857-859, Mar. 3, 2005.
Immersion Corporation, URL: http://www.immersion.com/corporate/products/, corporate home page describing Immersions surgical training simulators—"Wireless Data Glove: The CyberGiove[registered]II System," 5 pgs, obtained from the website Nov. 17, 2005 and Jan. 24, 2008.
injuryboard.com, "Reducing complications associated with central vein catheterization," URSL: http://www.injuryboard.com/view.cfm/Article=668, 5 pgs, obtained from website May 11, 2005.
Intersense, home page listing motion tracking products, http://www.isense.com/prodcuts.aspxid=42 , 1 pg, obtained from website Jan. 24, 2008.
Jemmett, M. E., et. al., "Unrecognized misplacement of endotracheal tubes in a mixed urban to rural emergency medical services setting," Acad Emerg Med, 10(9):961-964, Sep. 2003.
Katz, S. H. and Falk, J. L., "Misplaced endotrachial tubes by paramedics in an urban medical services system," Annals Emerg Med, 37:32-37, Jan. 2001.
Lewis, R., "Educational research: time to reach the bar, not lower it," Acad Emerg Med, 12(3):247-248, Mar. 2005.
Liu, A. et. al., "A survey of surgical simulation: applications, technology, and education," Presence, 12(6):1-45, Dec. 2003.
Manchester Visulations Centre, "Webset project-bringing 3D medical training tools to the WWWW," http://www.sve.man.ac.uklmvc/research/previous/website, 3 pgs, obtained from the website Sep. 8, 2004.
Mclellan, H., "Virtual realities," Mclellan Wyatt Digital, 33 pgs.
Medical Simulation Corporation, corporate home page describing management team/frequently asked questions, http://www.medsimulation.com/about_msc/key_employees.asp, 7 pgs, obtained from website Nov. 25, 2004.
Medtronic, "The StealthStation[registered] treatment guidance system," the corporate home page describing the company fact sheet and profile; http://www.medtronic.com/Newsroom, 4 pgs, obtained from website Mar. 5, 2005.
Mort, T. C., "Emergency tracheal intubation: complications associated with repeated laryngoscopic attempts," Anesth Analg, 99(2):607-613, Aug. 2004, 1 pg, obtained from website Sep. 8, 2004 (abstract).
Nazeer, S. R., et. al., "Ultrasound-assisted paracentesis performed by emergency physicians v.s. the traditional technique: a prospective, randomized study," Amer J of Emer Med, 23:363-367, 2005.
NCA Medical Simulation Center, Tutorial-simulation for medical training, http://Simcen.usuhs.millmiccaie, 4 pgs. 2003.
Next Dimension Imaging, "Products-Anatomy Analyzer 2," http://www.nexted.com/anatomyanalyzer.asp, 2 pgs, obtained from website Dec. 7, 2004.
Norris, T. E. et. al., "Teaching procedural skills," J General Internal Med, 12(S2): S64-S70, Apr. 1997.
On the Net Resources-Education and Training, URL: http://www.hitl.washington.edu/projects/knowledge_base/education.html, corporate home page regarding internet sites regarding education and training, 16 pgs, obtained from website Jan. 8, 2005.
Osberg, K. M., "Virtual reality and education: a look at both sides of the sword," http://www.hitl.washington.edu/publications/r-93-7/, 19 pgs, Dec. 14, 1992, obtained from website Jan. 21, 2008.
Osmon, S. et. al., "Clinical investigations: reporting of medical errors: an intensive care unit experience," Grit Care Med, 32(3), 13 pgs, Mar. 2004.
Patrick S. H. Lewis, P. L. S. H., Perez, E., Piktus, A., Petroni, F., Karpukhin, V., Goyal, N., Kuttler, H., Yih, W., Rocktaschel, T., Riedel, S., Kiela, D. (May 22, 2020). Retrieval-Augmented Generation for Knowledge-Intensive NLP Tasks. arXiv. Retrieved Sep. 9, 2024, from https://arxiv.org/abs/2005.11401.
Ponder, M., et. al., "Immersive VR decision training: telling interactive stories featuring advanced human simulation technologies," Eurographics Association 2003, 10 pgs.
Primal, corporate home page describing resources for teaching healthcare practitioners, 2 pgs, obtained from website.
Prystowsky, J. B. et. al., "A virtual reality module for intravenous catheter placement," Am J Surg 1999; 177(2):171-175 (abstract).
Reachin, "Medical Training Development Centre/Reachin technologies AB has entered into a corporation with Mentice AB," Jan. 20, 2004, 4 pgs, obtained from website Nov. 9, 2004.
Rothschild, J. M., "Ultrasound guidance of central vein catheterization," NCBI, Nat Lib Med, www.ncbi.nlm.nih.gov/books/, HSTAT 21, 6 pgs, obtained from website May 11, 2005.
Rowe, R. and Cohen, R. A., "An evaluation of a virtual reality airway simulator," Anesth Analg 2002, 95:62-66.
Sensable Technologies, "Phantom Omni Haptic Device," 2 pgs, http://www.sensable.com/haptic-ohantom-omni.htm., obtained from website Jan. 24, 2008.
Milletari, Fausto, Vighnesh Birodkar, and Michal Sofka. "Straight to the point: Reinforcement learning for user guidance in ultrasound." Smart Ultrasound Imaging and Perinatal, Preterm and Paediatric Image Analysis: First International Workshop, SUSI 2019, and 4th International Workshop (Year: 2019).
Rabe, Markus, et al. "Combining a discrete-event simulation model of a logistics network with deep reinforcement learning." Proceedings of the MIC and MAEB 2017 Conferences. Jul. 4-7, Barcelona, Spain. 2017. (Year: 2017).
Shaffer, K., "Becoming a physician: teaching anatomy in a digital age," NEJM, Sep. 23, 2004; 351(13):1279-81 (extract of first 100 words—no abstract).

(56) References Cited

OTHER PUBLICATIONS

Thapa, Devinder, In-Sung Jung, and Gi-Nam Wang. "RI based decision support system for u-healthcare environment." Reinforcement Learning. IntechOpen, 2008. (Year: 2008).

* cited by examiner

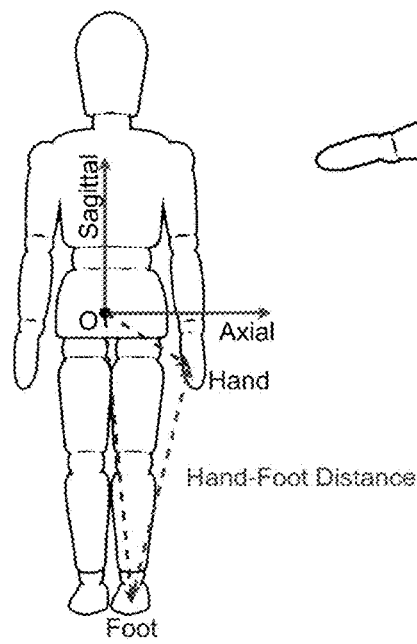
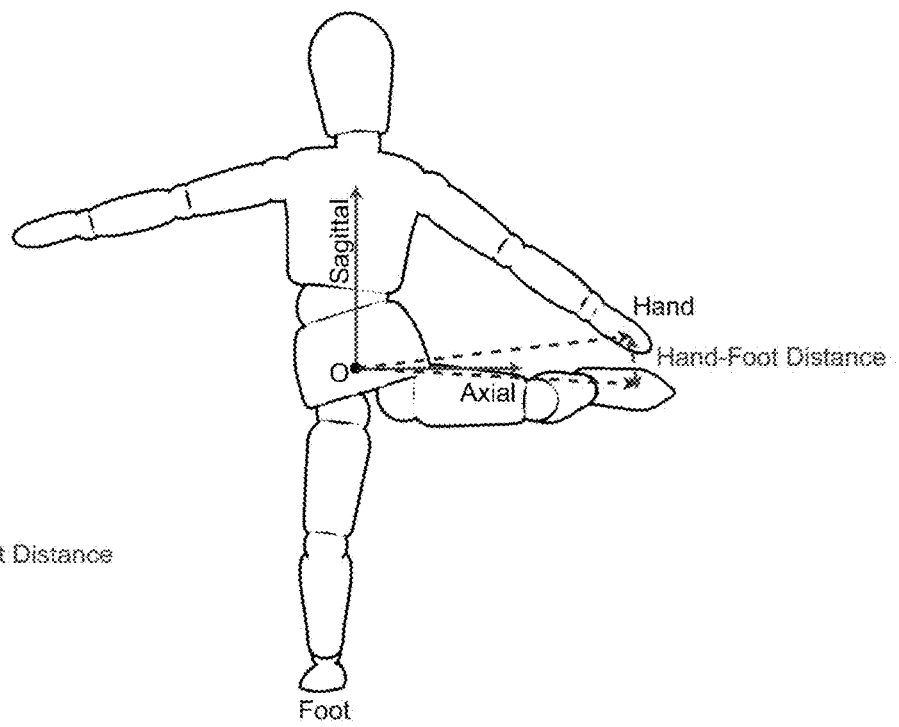
FIG. 6A
FIG. 6B

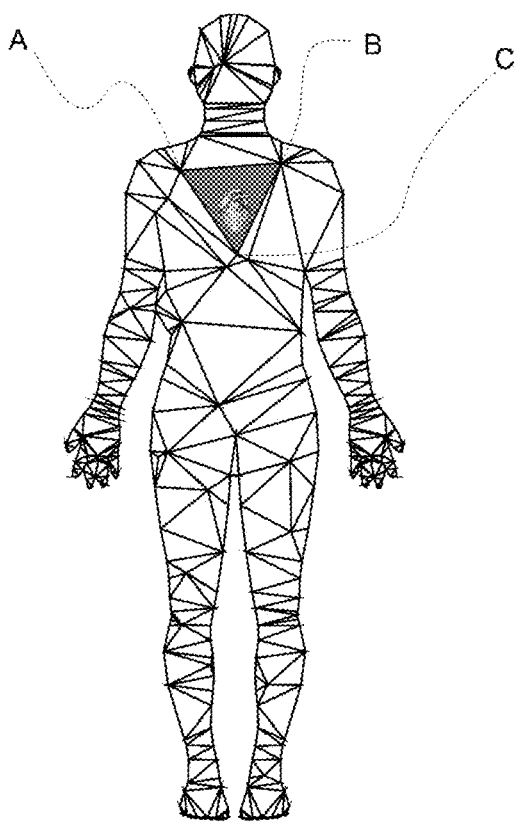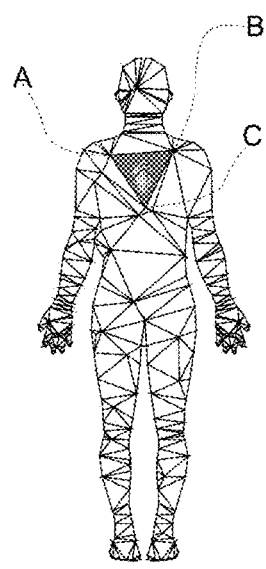
FIG. 7A                    FIG. 7B

MULTI-MODAL ENHANCEMENT OF LARGE LANGUAGE MODELS WITHOUT RETRAINING

CROSS REFERENCE TO RELATED APPLICATIONS

This patent application claims the benefit of U.S. Provisional Patent Application Ser. No. 63/583,092, entitled "Enhancing Medical Query Responses from Large Language Models," filed Sep. 15, 2023, which application is incorporated in its entirety here by this reference.

FIELD OF THE INVENTION

Generative AI applications that operate in a specific domain such as the medical field.

BACKGROUND

Recent Large Language Models (LLMs) have demonstrated remarkable capabilities in generating human-like answers to complex queries and providing information across a broad range of different domains of knowledge. The application of LLMs to generate relevant content is generally known as Generative Artificial Intelligence (Generative AI or GenAI for short). However, LLMs are also prone to delivering factually incorrect and sometimes purely fabricated replies. This phenomenon is often known as "hallucinations". The problem of hallucinations is particularly acute for applications where misleading or unreliable answers can cause serious harm such as for medical decision-making. The challenge of producing more reliable and trustworthy LLMs is called alignment in the field of AI, and it is currently a source of major research and commercial development. One general solution practiced by vendors who develop foundational LLMs is to either improve the model architecture or the data used to train the model itself. This approach is simultaneously very resource-intensive, slow, and has shown relatively limited success in practice. Notably, achieving alignment through re-architecting and re-training the models provides no real guarantees that the final model will always behave as expected. Therefore, there is a need for better techniques to improve alignment in LLMs.

SUMMARY OF THE INVENTION

This invention presents a system and method that improves the alignment of LLMs: 1) without requiring changes to the architecture of the pre-trained LLMs, 2) without requiring extensive re-training of the model, and 3) allowing the integration of multi-modal information into existing models. One emerging approach that has proven successful in improving alignment is called Retrieval Augmented Generation (RAG) (Patrick S. H. Lewis et al., 2020) and it relies on two key ideas: 1) restricting the applicability of the LLM to a more specific domain of knowledge, and 2) leveraging vector search to ground the generative capabilities of the LLM to content that is known to be factually correct.

The notion of grounding refers to anchoring the text generated by the LLM to a specific set of content that is trusted. Vector search (also known as semantic search) exploits the notion that pre-trained LLMs can be used to convert sentences of natural language text into numerical representations called vector embeddings using known techniques with desirable statistical properties (see, FIG. 1). Vector embeddings that correspond to sentences that are conceptually or semantically related are closer to each other in this vector space than sentences that are conceptually or semantically unrelated. Vector embeddings of conceptually or semantically related concepts are well-clustered in the vector space. Clusters of conceptually related vector embeddings are well separated from clusters of unrelated vector embeddings as shown in FIG. 1.

In this regard, the notion of proximity or closeness of two vector embeddings is defined by a proximity metric. Mathematically, if we call the space of the vector embedding V, the proximity metric d is a function that takes two values in V and returns a scalar that measures how close two vectors are. Common choices of proximity metric are the dot product, cosine similarity, or the Euclidean distance. As such, the proximity metric can be a similarity metric or a distance metric. The difference between a similarity metric and a distance metric is the former needs to be maximized to improve proximity or closeness, while the latter needs to be minimized to improve proximity or closeness. However, the specific choice of proximity metric is not necessarily relevant to the scope of this invention and any choice that adequately quantifies the proximity of two vectors is valid for the present invention. In the remainder of this text, the measurement of closeness between two vectors is referred to as the proximity between the vectors with the understanding that a similarity metric, a distance metric, and the like, can be used for this purpose as long as the inequalities in the formulation are defined consistently.

Practitioners recently leveraged the concept of vector embeddings and vector search to implement a new generation of database systems called vector databases. In a vector database, text records are associated with the corresponding vector embedding and stored in persistent storage. When the user formulates a query in natural language, the vector database proceeds as follows: 1) convert the query text into a vector embedding (query vector) q, 2) use an algorithm, such as k-nearest neighbor search, to find k vectors in the database that are chosen as being the closest to the given query vector based on the chosen similarity metric, 3) present the text results corresponding to the k chosen vectors to the user.

Furthermore, the distance between the query vector and the k vectors found by the k-nearest neighbor search can be used directly to rank the results from most relevant to least relevant, the shorter the distance $d(q,v_i)$ being the more relevant and the longer distance $d(q,v_i)$ being the less relevant. Call r: $\Re \rightarrow \Re$ the ranking function, then we can associate a score $s_i$ to each chosen vector $v_i$ by computing the distance between q and $v_i$ and using function r to obtain:

$$s_i \leftarrow r(d(q,v_i)).$$

Ranking the results amounts to sorting them based on the value of $s_i$, for example, from highest to lowest.

In some cases, practitioners may choose to employ a more advanced version of ranking functions sometimes known as neural reranking. With neural reranking: 1) the k nearest vector embeddings are chosen based on the proximity metric, 2) the neural reranker generates a score by comparing the textual representation of the query with the textual representation of the top k results. Neural rerankers are implemented by using machine learning techniques known to those skilled in the art where the model is trained on large number of text pairs to produce a score based on how closely related the pairs are.

Aside from delivering an entirely new and powerful type of database that can operate directly with natural language and match results based on meaning, the capabilities of vector databases have also proven very useful in improving the alignment of generative AI models through the aforementioned concept of Retrieval Augmented Generation (see, FIG. 2). To use RAG, developers first create a corpus of text data whose information is known to be trustworthy and store the data broken down by sentences (chunks) into a vector database. Then, when the user prompts the AI with a query, the system proceeds as follows: 1) receive a query from the user 102, 2) convert the text query to a corresponding vector embedding q 104 based on an LLM Embedding Model 105, 3) retrieve the k nearest results to the given query 106 in the vector database 107, 4) rank the results based on the relevance scores $s_i$ from highest score to lowest score 108, 5) pick the top n results 110, 6) map the n vectors to corresponding text 112 in the corpus 113, and 7) feed the top n results 114 as context for the LLM 116 accompanied by the original query q 102 in the form of an appropriate natural language prompt, and 8) display the response 118.

Assuming that the top n results $\{v_k, v_{k+1}, v_{k+2}, v_{k+n-1}\}$ are sufficiently consistent with the query q, the typical outcome of this process is that the LLM will ground the generated answer to the trusted knowledge of the corpus in the vector database. Without this kind of grounding, LLMs are more likely to generate results based on unreliable information that was present in the model's training data or on entirely fabricated notions. Steps 1-4 are called the retrieval phase and steps 5-7 are called the generation phase. Notably, LLMs, due to technical constraints, limit the number of tokens (smallest units of text used by LLMs) that can be used to formulate prompts, which in turn does not allow using an entire corpus of data as context. The benefit of RAG is that it overcomes this limitation in context size.

This approach works well as long as the retrieval phase truly produces results that are highly relevant to the query q. The latter is not guaranteed. If the query is not related to the domain of knowledge encompassed by the corpus, then the k nearest results are simply the least unrelated ones, but they may not be conceptually consistent with the query posed by the user. If the LLM has not received sufficient training in the specific domain encompassed by the corpus (e.g. medical literature), then the quality of the vector embeddings related to the chosen domain may be low and the distance between vector embeddings may not always correlate well to concepts that are semantically close to each other. The primary limitations of this approach are that: 1) the ranking function may not boost the most relevant results to lie within the top n results, and 2) the top n results may contain unexpected outliers that are not conceptually related to the given query.

If these undesirable conditions occur, then even with RAG the LLM may produce inconsistent or unexpected results (in most cases the text is still grounded to the trusted corpus, so the generated text will be generally factually correct, but may not be adequately related to the query). The purpose of this invention is to augment the vector embeddings, the proximity metric, and the ranking function to substantially alleviate the occurrence of the shortcomings mentioned above and thus improve the alignment of generative AI without requiring re-training of the underlying LLM.

The invention comprises associating each vector embedding with another modality of information (e.g., positional data, geolocation, color space data, functional data, financial profiles, and the like) according to conditions and constraints defined in detail later in the document. The elements of this additional modality of information is referred to herein as context vectors. If the new context vectors are expressed in such a way that one can associate a given query with the appropriate context vector, then one can augment the original vector embeddings with the context vectors, appropriately augment the proximity metric, and augment the ranking function to obtain a new extended form of RAG that leverages more accurate contextual information when generating results.

BRIEF DESCRIPTION OF THE DRAWINGS

FIGS. 6A-6B are illustrations showing the position of the hand and foot represented with respect to a body-aligned reference frame centered at the pelvis. The distance between the hand and foot is not invariant to changes in the pose J.

FIGS. 7A-7B are 2D illustrations showing the location of the heart expressed with respect to a local domain (the area inside triangle ABC). In the simplified 2D case, the simplex is the triangle. Note that the position of the heart is expressed consistently in terms of the vertices A,B,C and it is invariant under changes in body habitus.

DETAILED DESCRIPTION OF INVENTION

Figure 1:
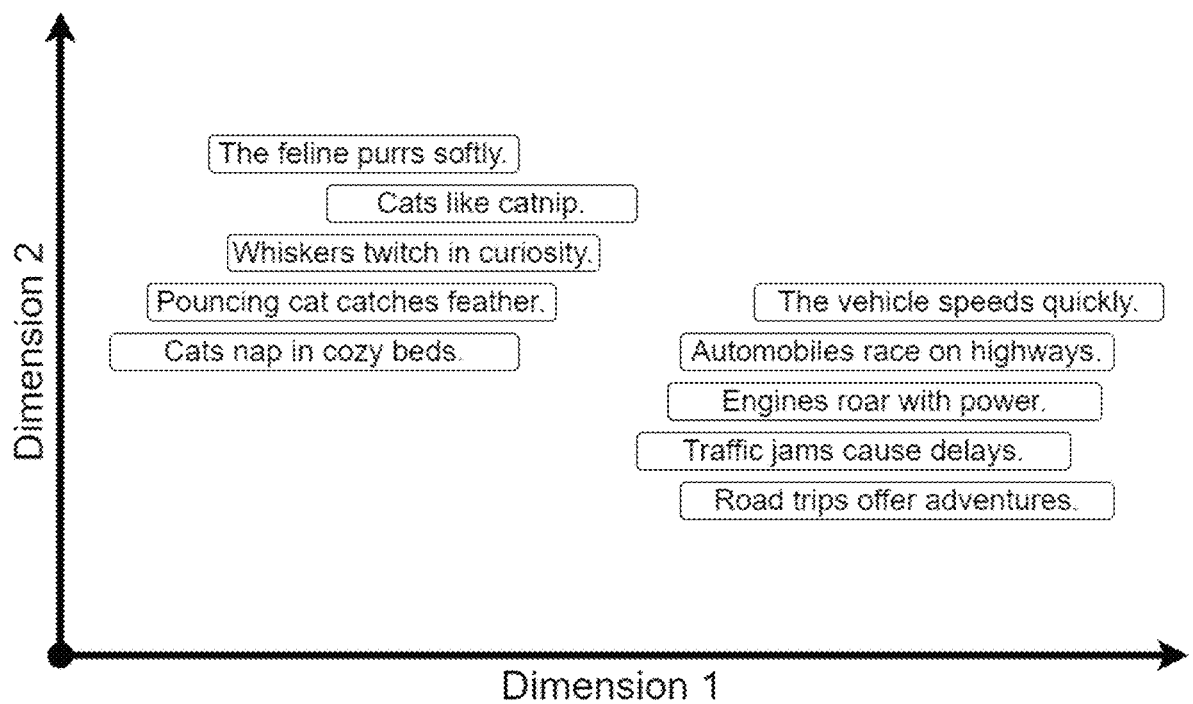
FIG. 1 shows an illustration of the clustering of vector embeddings for short sentences related to the concepts of "cat" and "car" in two hypothetical embedding dimensions (real vector embeddings typically have over a thousand dimensions). The training of the LLM moves sentences that are conceptually related close to each other in the vector space but keeps unrelated concepts well-separated.
Figure 2:
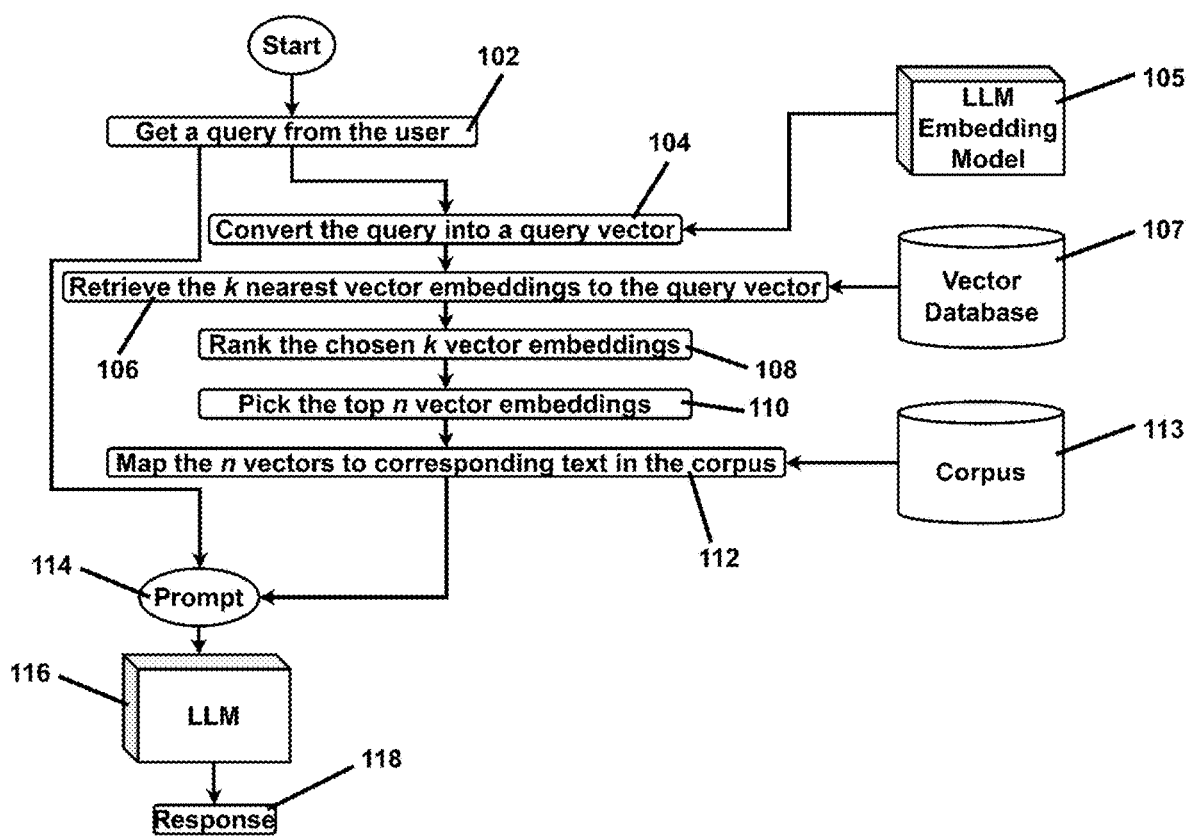
FIG. 2 is a flow diagram of a Retrieval Augmented Generation.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The invention of the present application is a system and method for improving responses to queries to large language models (LLM) without having to retrain the LLM. As a preferred embodiment, the invention is described in the context of medical knowledge, but the presented system and method can be applied to many other domains of knowledge without departing from the spirit of the invention, such as law, engineering, math, science, philosophy, sociology, history, literature, and the like. We start from a corpus C of trusted textual data, $c_i \in C$, curated by known experts. For example, experts in the field of medicine, law, engineering, math, science, philosophy, sociology, history, literature, and the like, would create the textual data of facts, concepts, ideas, opinions, theories, laws, hypotheses, proposals, and the like. The textual data $c_i$ can be converted into vector embeddings $v_i \in V$ using an embedding model E, where $v_i = E(c_i)$. As such, a plurality of vector embeddings can be stored in a vector database. Similarly, a query from a user can be converted into a query vector q.

One can compute the proximity between two vector embeddings in V, and between a vector embedding in V and the query vector, with a properly chosen vector proximity metric $d_V$. The proximity metric $d_V$ is a measure of the closeness of units of data being compared. As such, the vector proximity metric $d_V$, can be a measure of numerical distance, geometric distance, semantic similarity, vector alignment, conceptual similarity, visual similarity, auditory similarity, and the like. The proximity between two vector embeddings or between a query vector and a vector embedding can be considered a raw measurement. As such, if the proximity measure is distance, then the proximity metric would measure a raw distance between two vector embeddings or between a vector embedding and the query vector.

In the present invention, an additional modality of information is selected that may or may not be textual, but is strongly correlated to the domain of knowledge of the corpus. This is called the extended context, P. The elements of P, $p_j \in P$ are the context vectors $p_j$ and the set P, which is endowed with an augmented proximity metric $d_P$ (a metric that is appropriately defined for measuring the closeness of context vectors). Based on one's domain knowledge, the practitioner or an appropriately defined algorithm associates the query vector and/or each vector embedding $v_i \in V$ with a conceptually related context vector $p_j \in P$. For example, let M be the function that maps $v_i$ to $p_j$ using known techniques: $p_i = M(v_i)$.

In general, the set P is chosen so that: $|P| \leq |V| = |C|$ (Eq. 1).

In one embodiment, the problem of mapping queries to context vectors $p_j$ can be formulated as a problem of classification. Hence, to make the classification scalable and manageable by an LLM, the size of the set P needs to be kept small, and specifically, smaller than the set of vector embeddings V. In other words, a given value $p_j$ may be associated with multiple values of $v_i$, which in turn are in a one-to-one mapping with text data $c_i$. Given a query vector q, and set of k vectors $v^q_i \in V^q$ (k can be any predetermined number) that are found to be closest to q by the proximity metric $d_v$ (these are the candidates vector embeddings that could potentially be used in the prompt), the purpose of the context vectors $p_j$ is to boost (i.e. increase) or bury (i.e. decrease) the rankings of the tuple $(q, v^q_i)$ to improve the quality of the results produced by vector search and identify the most relevant vector embeddings to use in the prompt.

By way of example only, in the medical field, the corpus C can contain a collection of text paragraphs describing pathologies of each organ in the human body. Each of these text paragraphs would be associated with vector embeddings and make up the total vector embeddings in the vector database. For instance, paragraphs $c_a$, $c_b$ may describe pathologies affecting the tonsils, and paragraph $c_c$ may describe possible ways the appendix can get inflamed. Given the query "What are common causes of tonsillitis?" and its corresponding vector embedding q, we expect the vector database to rank vectors $v_a, v_b$ that correspond to paragraphs $c_a, c_b$ higher (i.e. closer) than other vectors that do not relate to the tonsils, such as vector $v_c$. However, it may occur in practice that the proximity $d_V(q, v_c)$ is higher than both proximities $d_V(q, v_a)$ and $d_V(q, v_b)$ so that the top result of vector search produced by applying the ranking function to the aforementioned distances will be $v_c$, which would not be desirable. In other words, if the set of k vectors was predetermined to be 3, and $d_V(q, v_c)$, $d_V(q, v_a)$ and $d_V(q, v_b)$ were the top three proximal vectors to the query vector, then $v_c$, $v_a$, and $v_b$ would be the set of candidate vector embeddings even though $v_c$ does not appear to be relevant. Given the inherent complexities and opaque nature of LLMs it is generally not possible to troubleshoot the root cause of such unexpected results. Perhaps the embedding may place tonsils and the appendix close to each other in the embedding space because both are likely to get inflamed and they may have appeared in similar contexts in the training data of the model.

Since users cannot easily alter the LLM that produces the embeddings to facilitate the expected outcome, the present invention utilizes the context vectors $p_j$ to reliably alter the rankings and boost results related to tonsils to queries asking about tonsils. By way of example only, we can define the context vectors p; as homogenized coordinates (see section on "Coordinate Homogenization") of the location of each organ in the body and associate the vector embeddings of each paragraph with the corresponding location on the body, such that:

$$v_a = E(c_a) \rightarrow p_1 = M(v_a) \text{(location of tonsils)}$$
$$v_b = E(c_b) \rightarrow p_1 = M(v_b) \text{(location of tonsils)}$$
$$v_c = E(c_c) \rightarrow p_2 = M(v_c) \text{(location of appendix)}$$

Therefore, each vector embedding v is now associated with a context vector p. The query q can also be mapped to the same vector space of P using function M (see section on "Mapping Function" for more details): $q^P = M(q)$, which for the query "What are common causes of tonsillitis?" is the location of tonsils: $q^P = p_1$.

Assuming that the proximity metric is chosen to be a distance metric where the distance of a vector with itself is zero, $d(v,v)=0$; then prior to applying the context vector, the raw distance would be as follows:

$$d_V(q, v_c) < d_V(q, v_a)$$
$$d_V(q, v_c) < d_V(q, v_b)$$

which is the undesirable condition that leads appendix to be chosen for a query about the tonsils.

But, by using the augmented proximity metric, by virtue of introducing the context vectors and a mapping function, we obtain that:

$$d_P(M(q), M(v_c)) = d_P(q^p, p_2) = d_P(p_1, p_2) > 0$$
$$d_P(M(q), M(v_a)) = d_P(q^p, p_1) = d_P(p_1, p_1) = 0$$
$$d_P(M(q), M(v_b)) = d_P(q^p, p_1) = d_P(p_1, p_1) = 0$$

Hence, the augmented distances are:

$$d_P(M(q), M(v_c)) > d_P(M(q), M(v_a))$$

$$d_P(M(q), M(v_c)) > d_P(M(q), M(v_b))$$

Therefore, according to the augmented proximity metric $d_P$ paragraphs related to tonsils $c_a, c_b$ are closer to the given query than the unrelated paragraph $c_c$ discussing the inflammation of the appendix.

At this point, a new augmented ranking function r': $\Re \times \Re \to \Re$ is defined that uses a blend of both distance metrics $d_V$ and $d_P$ to score the results from vector search in a way that is more consistent with our expectations for the given domain of knowledge to generate a more relevant set of vector embeddings from the candidate of vector embeddings:

$$s'_i \leftarrow r'(d_V(q,v_i), d_P(q,M(v_i)))$$

(an adequate definition for r' is discussed later in this section). The core advantage of this approach is that for many domains of knowledge there exist many effective choices of extended context (e.g., location of body parts and organs for medical text) so that distances between its elements are always strongly correlated to semantic closeness. This contrasts with proximity measured in the space of vector embeddings where their correlation to semantic closeness is defined by the LLM embedding model probabilistically and it is not entirely predictable. In the example above, applying a context vector to the query vector and the 3 candidate vectors would result in a refinement of the ranking such that the vector embedding associated with tonsils ($v_c$) would be much further from the query vector or buried deeper in the ranking so as to fall out of the set of candidate vector embeddings, resulting in a set of relevant vector embeddings that one would expect.

More formally, given a space of vector embeddings V, in order to properly define the extended context, a vector space is chosen that is relevant to the domain of expertise in a desired field (e.g., medical field) and satisfies the following properties: 1) A space of vectors $p_j \in P$, 2) A measure of closeness $d_P$, 3) An augmented ranking function r', and 4) A mapping function M: V→P, such that for every query vector q:

$$d_P(M(q),p_i) < d_P(M(q),p_j) \Rightarrow r'(d_V(q,v_i), d_P(M(q),p_i)) > r'(d_V(q,v_j), d_P(M(q),p_j)) \quad \text{(Eq. 2)}$$

where $p_i = M(v_i)$ and $p_j = M(v_j)$.

This last condition stipulates that if a context vector p in P is closer to a given query q, then the augmented ranking function r' should give a higher score to the vector embedding corresponding to the context vector p. A general choice of r' that may be appropriate for most applications is a linear blend of the proximity metrics for vector embeddings and context vectors:

$$r'(d_V(q,v), d_P(M(q),p)) = -((1-\alpha)d_V(q,v) + \alpha d_P(M(q),p))$$

where $\alpha$ is a tuning parameter chosen appropriately to satisfy the condition in equation 2 above. Parameter $\alpha$ may be a fixed value chosen manually or it may be dynamically chosen by a machine learning algorithm trained specifically to improve the quality of the ranking for a broad range of data points to identify a more relevant set of vector embeddings. If the proximity metric is chosen to be a similarity metric, then the sign of r' would be flipped.

In another embodiment, each context vector is associated with a confidence bound. The confidence bound is used to weigh the proximity measure. For instance, if the context vector is a small organ like the gallbladder which is well localized in a particular region of the body, its influence should be higher in the computation of the proximity metric, than a larger organ like the skin, which is distributed across the body and not localized in a specific region.

Figure 3:
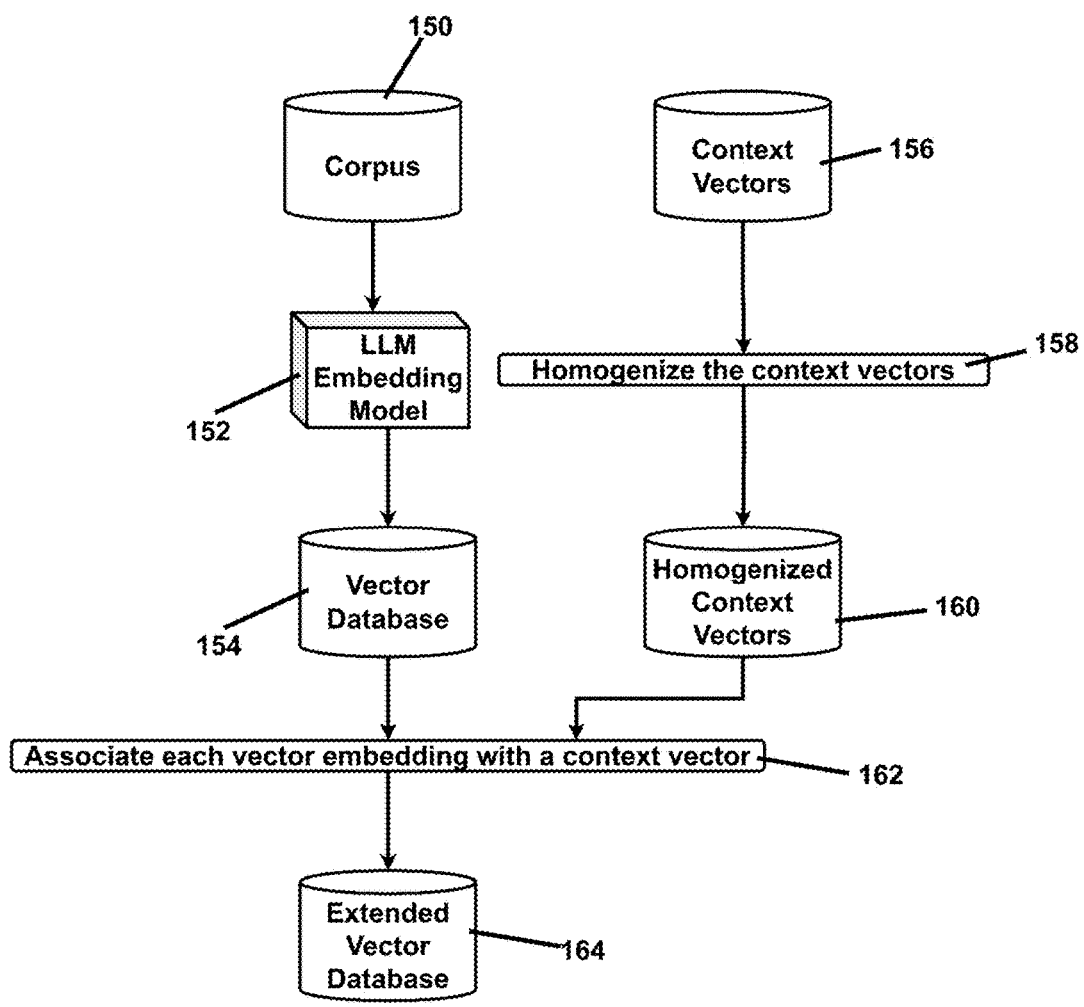
FIG. 3 is a flow diagram illustrating how to create the extended vector database.

In summary, the invention comprises a system and method made of two parts: First, create an extended vector database as shown in FIG. 3 as follows: Given a corpus of knowledge C 150 defined by a collection of text, compute a vector embedding 152 using known techniques for each item in the collection via the LLM embedding model to create a vector database 154. Introduce another modality of information (extended context) 156 appropriate to the domain of knowledge defined by the corpus C (this choice must be made the practitioner skilled in the art and knowledgeable of the domain) where: i) values can be readily defined numerically as vectors (context vectors), and ii) distances between vectors correlate well with semantic similarity. Homogenize the context vectors 158 so that they define a consistent measure of closeness if needed (this is explained in the Section "Coordinate Homogenization") to create a homogenized context vector database 160. Map each homogenized context vectors with one or more vector embedding 162 (see section on "Mapping Function") to create the extended vector database 164.

Figure 4:
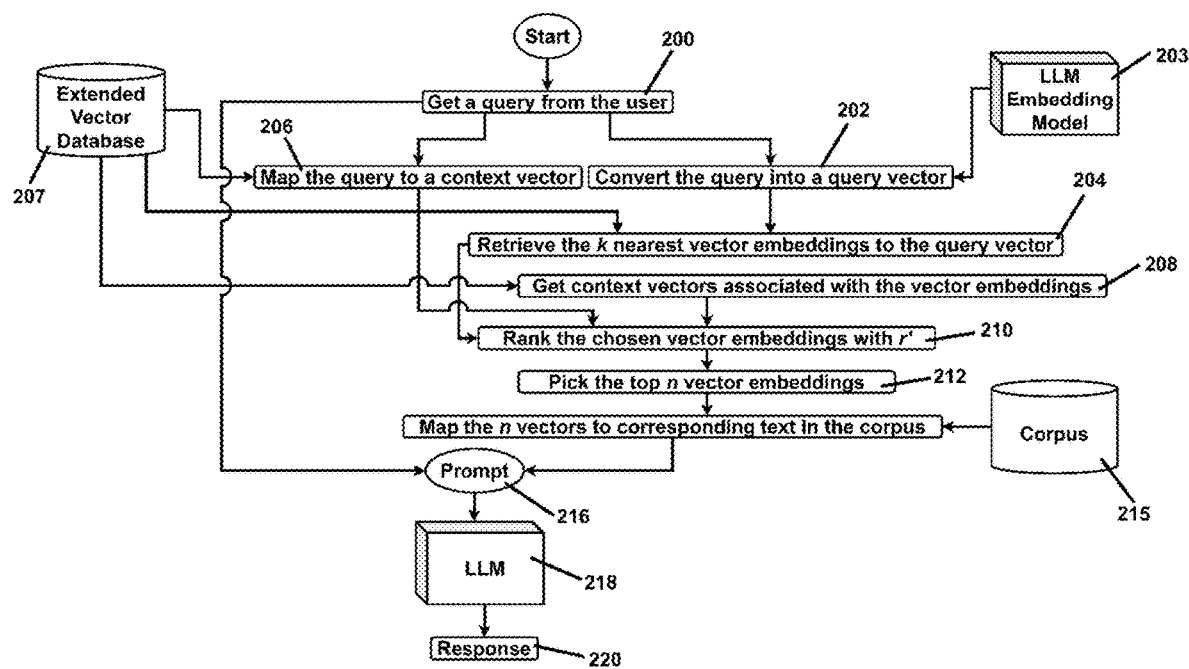
FIG. 4 is a flow diagram of an embodiment of the present invention.

Second, perform an extended version of Retrieval Augmented Generation (see, FIG. 4) as follows: Given a query 200, compute the corresponding query vector 202 using the embedding function (for example using the embedding model associated with an LLM 203). Find the k nearest vector embeddings to the query vector 204. From the same query, determine the corresponding context vector 206 using function M (see section on "Mapping Function") based on the extended vector database 207. Retrieve the context vectors associated with the k vector embeddings 208. Apply the augmented ranking function to the information gathered thus far to assign scores to each of the k results 210. Sort the results based on the ranking score (e.g., from largest to smallest) and select a predetermined number of the top vector embeddings 212. Map the top vector embeddings to the corresponding text in the corpus 214 from the corpus of text 215. Create a prompt 216 for a large language model comprising the query and the text data corresponding to the set of relevant vector embeddings as context. Feed the prompt to the large language model 218 to generate a response 220 to the query. Display the response to the user.

In light of the aforementioned description, a method for reducing hallucinations or improving relevance of a response to a query in a large language model can comprise the steps of: receiving a query from a user; converting the query into a query vector; in a vector database comprising a plurality of vector embeddings, using a proximity metric to measure a raw distance from the query vector to each vector embedding in the plurality of vector embeddings, wherein each vector embedding in the plurality of vector embeddings corresponds with a text data; comparing the raw distance from the query vector to the plurality of vector embeddings; evaluating a ranking function to order the plurality of vector embeddings to the query vector based on distance; retrieving a predetermined number of vector embeddings to establish a set of candidate vector embeddings that are most proximal to the query vector (e.g., their similarity measure is higher or their distance measure is lower) compared to the remaining vector embeddings in the plurality of vector embeddings; mapping the query to one homogenized context vector from a plurality of homogenized context vectors; using an augmented proximity metric to convert the raw proximity for each of the candidate vector embeddings to an augmented proximity for each of the candidate vector embeddings; performing an augmented ranking to refine the set of candidate vector embeddings to a set of relevant vector embeddings; creating a prompt for a large language model comprising the query and the text data corresponding to the set of relevant vector embeddings as context; and feeding the prompt to the large language model to generate a response to the query.

The step of using a proximity metric to measure a raw distance from the query vector to each vector embedding and selecting the best vector embeddings can comprise maximizing the proximity metric. Maximizing the proximity metric comprises maximizing a similarity metric or minimizing a distance metric.

The step of mapping the query to the homogenized context vector can comprise using the large language model to classify the query based on a text label associated with the homogenized context vector. Each homogenized context vector is obtained by re-scaling a raw context vector so that the augmented proximity vector is defined consistently irrespective of a parameterization of a domain as described in further detail below regarding coordinate homogenization. The raw context vector can be homogenized using local domains, such as bounded geometric shapes that partition the overall space. In some embodiments, the raw context vector can be homogenized using landmarks. For example, in the medical field, the landmarks can be anatomical body parts.

Preferably, before using the augmented proximity metric, each vector embedding is associated with one of the homogenized context vectors of the plurality of homogenized vectors and stored in an extended vector database.

Mapping Function

This section explains how to define the function M for mapping vector embeddings to context vectors. Given that the sets V and P are discrete and finite, the association between vector embeddings $v_i$ and context vectors $p_j$ can be achieved through a simple lookup table. However the process of mapping a query vector to a context vector in P is not trivial. One may try to frame it as an optimization problem; if the proximity measure is a similarity measure, given a finite set of context vectors $\{p_1, p_2, \ldots, p_n\}$ find the value $q^P$ such that:

$$q^P = \underset{p_j}{\operatorname{argmax}}\ d_V(q, M^{-1}(p_j)),$$

where $M^{-1}$ is the inverse mapping of M. Alternatively, if the proximity measure is distance measure, find the value $q^P$ such that $$q^P = \underset{p_j}{\operatorname{argmax}}\ d_V(q, M^{-1}(p_j)).$$

This equation, however, while being well-defined, does not have a unique solution in general. As stated in equation 1 multiple values of V may map to the same value of P, which means that $M^{-1}(p_j)$ is not unique.

Assuming that the cardinality of P, |P| is small, the problem of mapping q to $q^P$ can be alternatively cast as a problem of classification. Instead of considering the query in the space of the vector embeddings, $$q=E(\bar{q})$$

we operate on the original textual version of the query $\bar{q}$ directly. Furthermore, let $\{\bar{p_1}, \bar{p_2}, \ldots, \bar{p_n}\}$ be a text label associated with the context vectors $\{p_1, p_2, \ldots, p_n\}$. Knowing that LLMs are particularly good at classifying text within a finite number of classes, the mapping between q and $q^P$ can be found directly by using a prompt of the form: Given the query "$\bar{q}$" find the class that best describes this query among the following classes: $\{\bar{p_1}, \bar{p_2}, \ldots, \bar{p_n}\}$. Answer with a single word that indicates the chosen class or "UNKNOWN" if none of the classes is adequate.

The output of this prompt from the LLM will give the text label for the context of the query from which $q^P$ can easily be derived.

Coordinate Homogenization

For the method described above to work correctly it is essential that the choice of context vectors $p_j \in P$ is such that the measure of proximity $d_P$ can be defined consistently over the vector space. In many cases, such as in the case of geolocation data, this is not a problem. However, when the context vectors are defined on a field that can vary from one data acquisition of the context vectors to another, the metric may not be consistent and the raw distance between the same two conceptually related context vectors may vary substantially over the data set.

Figure 5A:
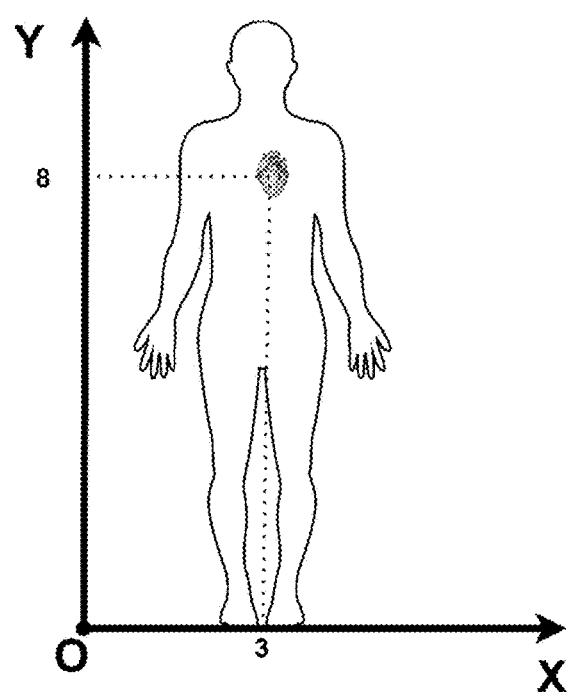
FIGS. 5A-5B are illustrations representing the position of the heart in the body using a world coordinate frame for two different body sizes. The location of the heart with respect to the body is not invariant to changes in body habitus H.
Figure 5B:
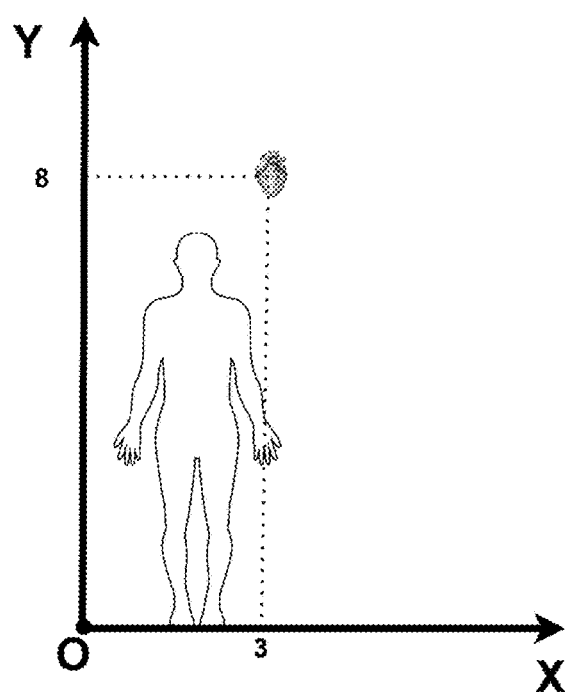

One notable example of this problem is radiological data. There is no well-defined coordinate system that allows defining the position and orientation of body organs consistently. Common choices of coordinate frames result in coordinates varying upon changes in the pose and/or body habitus of the patient. This section describes a solution to this problem. FIGS. 5 and 6 illustrate why a world coordinate frame or a body-aligned coordinate frame will not be satisfactory for this application.

Let B(J,H) be a function that yields the geometry of a human body given a parameterization of the pose J and the body habitus H, where B is the domain (body) and J and H are the parameterizations. What is sought is a homogenization or mapping of the context vectors $p_j \in P$, such that the distance between any two context vectors $d_P(p_i,p_j)$ is the same for all values of J and H. In other words, the context vectors are homogenized context vectors to account for different body sizes or different poses of a body. One approach is to discretize the body into a set of local domains defined as simplices (see, FIG. 7) and express the location of each body organ as a vector of the form:

$$(m,x,y,z,r_x,r_y,r_z)$$

where:
m is an index identifying the local domain
x, y, z are barycentric coordinates that express the location of the organ with respect to the local domain m
$r_x$, $r_y$, $r_z$ are a parametrization of the orientation of the organ with respect to a reference edge of the local domain.

One could define an equivalent vectorization of the location of a body organ using any other valid parameterization of position, such as trilinear coordinates, or rotations, such as quaternions. For example:

$$(m,x,y,z,q_x,q_y,q_z,q_w)$$

where $q_x$, $q_y$, $q_z$, $q_w$ are the components of a normalized quaternion.

The local domains can be generated using techniques known in the art such as the Delaunay tetrahedralization algorithm. One challenge with this approach is that there is no straightforward way of ensuring that the partitioning into local domains of the body stays consistent as the parameters J and H change.

Figure 8A:
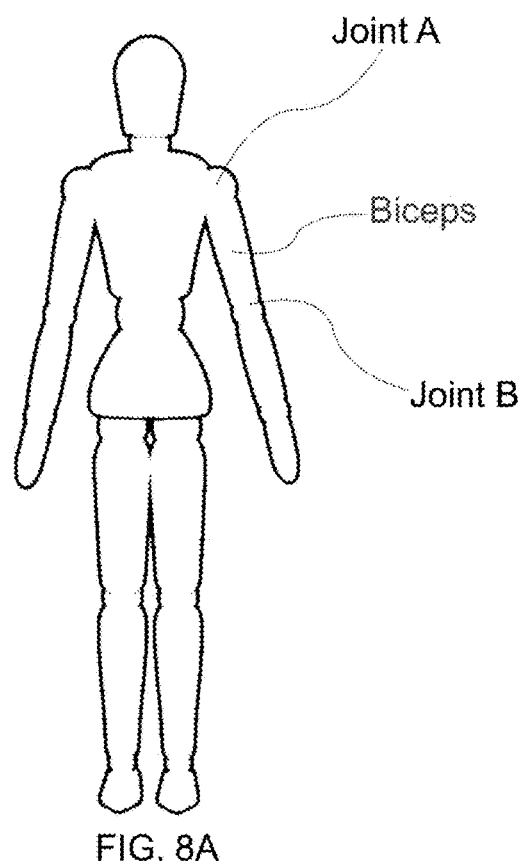
FIGS. 8A-8B are illustrations of the location of the biceps muscle expressed as the midpoint between two joint landmarks. Clearly the location of the biceps muscle expressed this way is invariant under changes in pose J.
Figure 8B:
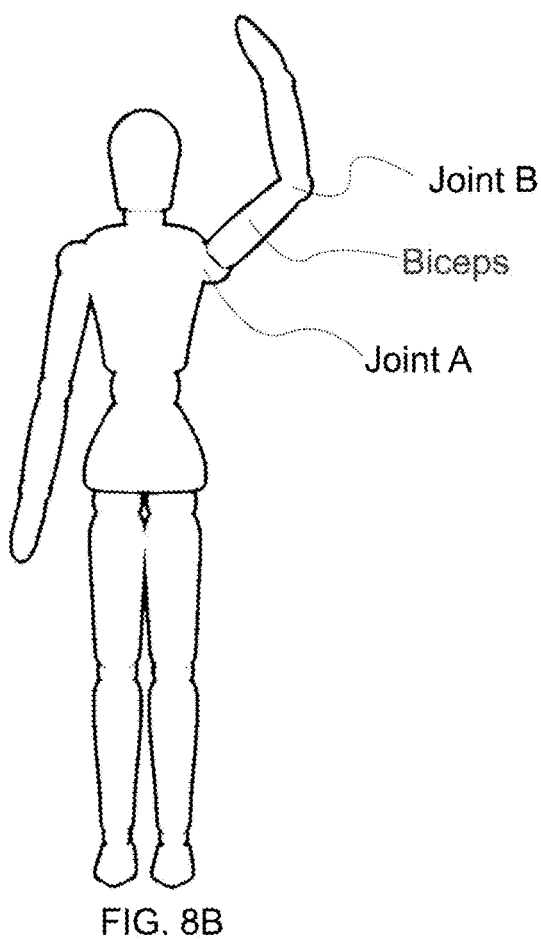

An alternate approach is to use well-established anatomical landmarks as reference points (e.g. the location of joints in the human skeleton) as reference positions that stay consistent when varying the pose J and habitus H of the body (see, FIG. 8). Given a choice of anatomical landmarks then one can define the position of organs as linear combinations of the landmark positions and the rotations as changes in orientation with respect to the coronal, sagittal, and axial planes of the body.

System Architecture

The system can take the form of an entirely hardware embodiment, an entirely software embodiment or an embodiment containing both hardware and software elements. As such, the system of the present invention can comprise a server connected to a network, the server receiving product requests from users via the network, the server comprising at least one processor; a database for storing product information; and a memory operatively coupled to the processor, the memory storing program instructions that when executed by the processor, causes the processor to perform one or more of the functions and features described herein. In one embodiment, the system is implemented in software, which includes but is not limited to firmware, resident software, microcode, etc., configured to perform one or more of the functions and features described herein.

Furthermore, the system can take the form of a computer program product accessible from a computer-usable or computer-readable medium providing program code for use by or in connection with a computer or any instruction execution system configured to perform any one or more of the functions and features described herein. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium comprise a semiconductor or solid-state memory, magnetic tape, a removable computer diskette, a random access memory (RAM), a read-only memory (ROM), a rigid magnetic disk and an optical disk. Current examples of optical disks comprise compact disk-read only memory (CD-ROM), compact disk-read/write (CD-R/W) and DVD.

A data processing system suitable for storing and/or executing program code comprises at least one processor coupled directly or indirectly to memory elements through a system bus. The memory elements can include local memory employed during actual execution of the program code, bulk storage, and cache memories that provide temporary storage of at least some program code in order to reduce the number of times code is retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Described above, aspects of the present application are embodied in a World Wide Web ("WWW") or ("Web") site accessible via the Internet. As is well known to those skilled in the art, the term "Internet" refers to the collection of networks and routers that use the Transmission Control Protocol/Internet Protocol ("TCP/IP") to communicate with one another. The internet can include a plurality of local area networks ("LANs") and a wide area network ("WAN") that are interconnected by routers. The routers are special purpose computers used to interface one LAN or WAN to another. Communication links within the LANs may be wireless, twisted wire pair, coaxial cable, or optical fiber, while communication links between networks may utilize 56 Kbps analog telephone lines, 1 Mbps digital T-1 lines, 45 Mbps T-3 lines or other communications links known to those skilled in the art.

Furthermore, computers and other related electronic devices can be remotely connected to either the LANs or the WAN via a digital communications device, modem and temporary telephone, or a wireless link. It will be appreciated that the internet comprises a vast number of such interconnected networks, computers, and routers.

As the Internet has grown, so has the WWW. As is appreciated by those skilled in the art, the WWW is a vast collection of interconnected or "hypertext" documents written in HTML, or other markup languages, that are electronically stored at or dynamically generated by "WWW sites" or "Web sites" throughout the Internet. Additionally, client-side software programs that communicate over the Web using the TCP/IP protocol are part of the WWW, such as JAVA® applets, instant messaging, e-mail, browser plug-ins, Macromedia Flash, chat and others. Other interactive hypertext environments may include proprietary environments such as those provided in America Online or other online service providers, as well as the "wireless Web" provided by various wireless networking providers, especially those in the cellular phone industry. It will be appreciated that the present application could apply in any such interactive communication environments, however, for purposes of discussion, the Web is used as an exemplary interactive hypertext environment with regard to the present application.

A website is a server/computer connected to the Internet that has massive storage capabilities for storing hypertext documents and that runs administrative software for handling requests for those stored hypertext documents as well as dynamically generating hypertext documents. Embedded within a hypertext document are a number of hyperlinks, i.e., highlighted portions of text which link the document to another hypertext document possibly stored at a website elsewhere on the Internet. Each hyperlink is assigned a URL that provides the name of the linked document on a server connected to the Internet. Thus, whenever a hypertext document is retrieved from any web server, the document is considered retrieved from the World Wide Web. Known to those skilled in the art, a web server may also include facilities for storing and transmitting application programs. Likewise, a web server may also include facilities for executing scripts and other application programs on the web server itself.

A remote access user may retrieve hypertext documents from the World Wide Web via a web browser program. A web browser is a software application program for providing a user interface to the WWW. Upon request from the remote access user via the web browser, the web browser requests the desired hypertext document from the appropriate web server using the URL for the document and the hypertext transport protocol ("HTTP"). HTTP is a higher-level protocol than TCP/IP and is designed specifically for the requirements of the WWW. HTTP runs on top of TCP/IP to transfer hypertext documents and user-supplied form data between server and client computers. The WWW browser may also retrieve programs from the web server, such as JAVA applets, for execution on the client computer. Finally, the WWW browser may include optional software components, called plug-ins, that run specialized functionality within the browser.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

The invention claimed is:

1. A method for enhancing query responses from large language models without retraining, the method comprising the steps of:
    a) receiving a query from a user;
    b) converting the query into a query vector;
    c) in a vector database comprising a plurality of vector embeddings, using a proximity metric to measure a raw distance from the query vector to each vector embedding in the plurality of vector embeddings, wherein each vector embedding in the plurality of vector embeddings corresponds with a text data;
    d) comparing the raw distance from the query vector to the plurality of vector embeddings;
    e) evaluating a ranking function to order the plurality of vector embeddings to the query vector based on distance;
    f) retrieving a predetermined number of vector embeddings to establish a set of candidate vector embeddings that are most proximal to the query vector compared to the remaining vector embeddings in the plurality of vector embeddings;
    g) mapping the query to one homogenized context vector from a plurality of homogenized context vectors;
    h) using an augmented proximity metric to convert the raw proximity for each of the candidate vector embeddings to the query vector to an augmented proximity for each of the candidate vector embeddings and their associated homogenized context vectors to the query vector and its mapped homogenized context vector, wherein each homogenized context vector is obtained by re-scaling a raw context vector so that an augmented proximity vector is defined consistently irrespective of a parameterization of a domain;
    i) performing an augmented ranking to refine the set of candidate vector embeddings to a set of relevant vector embeddings;
    j) creating a prompt for a large language model comprising the query and the text data corresponding to the set of relevant vector embeddings as context; and
    k) feeding the prompt to the large language model to generate a response to the query.

2. The method of claim 1, wherein the step of mapping the query to one homogenized context vector, comprises maximizing the proximity metric.

3. The method of claim 2, wherein maximizing the proximity metric comprises maximizing a similarity metric.

4. The method of claim 2, wherein maximizing the proximity metric comprises minimizing a distance metric.

5. The method of claim 1, wherein the step of mapping the query to the homogenized context vector, comprises using the large language model to classify the query based on a text label associated with the homogenized context vector.

6. The method of claim 1, wherein the raw context vector is homogenized using local domains.

7. The method of claim 1, wherein the raw context vector is homogenized using landmarks.

8. The method of claim 1, wherein before using the augmented proximity metric, each vector embedding is associated with one of the homogenized context vectors of the plurality of homogenized vectors and stored in an extended vector database.

9. A system for enhancing query responses from large language models without retraining, comprising:
    a server connected to a network, the server receiving product requests from users via the network, the server comprising: at least one processor; a database for storing information; and a memory operatively coupled to the processor, the memory storing program instructions that when executed by the processor, causes the processor to:
    a) receive a query from a user;
    b) convert the query into a query vector;
    c) use a proximity metric to measure a raw distance from the query vector to a plurality of vector embeddings stored in a vector database, wherein each vector embedding in the plurality of vector embeddings corresponds with a text data;
    d) compare the raw distance from the query vector to the plurality of vector embeddings;
    e) evaluate a ranking function to order the plurality of vector embeddings to the query vector based on proximity;
    f) retrieve a predetermined number of vector embeddings to establish a set of candidate vector embeddings that are most proximal to the query vector compared to the remaining vector embeddings;
    g) map the query to one homogenized context vector from a plurality of homogenized context vectors;
    h) use an augmented proximity metric to convert the raw distance to an augmented distance for each of the candidate vector embeddings, wherein the homogenized context vector is obtained by re-scaling a raw context vector so that a proximity vector is defined consistently irrespective of a parameterization of a domain;
    i) perform an augmented ranking to refine the set of candidate vector embeddings to a set of relevant vector embeddings;
    j) create a prompt for a large language model comprising the query and the text data corresponding to the set of relevant vector embeddings as context; and
    k) feed the prompt to the large language model to generate a response to the query.

10. The system of claim 9, wherein the mapping the query to the context vector, comprises maximizing the proximity metric.

11. The system of claim 10, wherein maximizing the proximity metric comprises maximizing a similarity metric.

12. The system of claim 10, wherein maximizing the proximity metric comprises minimizing a distance metric.

13. The system of claim 9, wherein mapping the query to the homogenized context vector, comprises using the large language model to classify the query based on a text label associated with the homogenized context vector.

14. The system of claim 9, wherein the raw context vector is homogenized using local domains.

15. The system of claim 9, wherein the raw context vector is homogenized using landmarks.

16. The system of claim 9, wherein before using the augmented proximity metric, each vector embedding is associated with one of the homogenized context vectors of the plurality of homogenized vectors and stored in an extended vector database.

* * * * *